United States Patent
Johansson (10) Patent No.: US 11,874,125 B2
(45) Date of Patent: Jan. 16, 2024

(54) REVERSING ASSISTANT FOR A VEHICLE

(71) Applicant: Volvo Truck Corporation, Gothenburg (SE)

(72) Inventor: Daniel Johansson, Gothenburg (SE)

(73) Assignee: Volvo Truck Corporation, Gothenburg (SE)

( * ) Notice: Subject to any disclaimer, the term of this patent is extended or adjusted under 35 U.S.C. 154(b) by 104 days.

(21) Appl. No.: 17/567,971

(22) Filed: Jan. 4, 2022

(65) Prior Publication Data
US 2022/0228878 A1  Jul. 21, 2022

(30) Foreign Application Priority Data

Jan. 19, 2021  (EP) .................................. 21152305

(51) Int. Cl.
*G01C 21/34* (2006.01)

(52) U.S. Cl.
CPC ................................ *G01C 21/3484* (2013.01)

(58) Field of Classification Search
CPC ..... B60W 30/18036; B60W 30/18045; B60W 2300/14; B62D 15/0285; B62D 13/06; B62D 15/02; G06V 20/56; G06K 9/00; G01C 21/3484
See application file for complete search history.

(56) References Cited

U.S. PATENT DOCUMENTS 8,666,548 B2 * 3/2014 Lim ..................... G06Q 10/047
700/250
8,825,262 B2 * 9/2014 Lee ..................... B62D 15/0275
701/25
9,908,558 B2 * 3/2018 Popken ................ G05D 1/0016
(Continued)

FOREIGN PATENT DOCUMENTS

DE  102014216577 A1  2/2016
EP      3744616 A1  12/2020

OTHER PUBLICATIONS

Ljungqvist, O., "Motion Planning and Feedback Control Techniques with Applications to Long Tractor-Trailer Vehicles," Linköping Studies in Science and Technology, Dissertation No. 2070, Apr. 20, 2020, Linköping University, Sweden, 119 pages.

(Continued)

*Primary Examiner* — Andrew Joseph Rudy
(74) *Attorney, Agent, or Firm* — Withrow & Terranova, PLLC (57) ABSTRACT

A reversing assistant system for a vehicle comprising a first path memory for storing a continuously recorded current forward segment, and a second path memory for storing a recorded preceding forward segment. The system is configured to transfer the content of the first path memory to the second path memory when the vehicle resumes forward motion after reversing, and it further comprises a path merger observer configured to repeatedly assess whether the current forward segment is mergeable with the preceding forward segment and, if so, to trigger a path merging operation. The system further comprises a path merger configured to execute a path merging operation and to substitute its output into the first path memory and a drive assistance unit configured to determine drive actions causing the vehicle to reverse along a recorded forward segment or a merged segment.

12 Claims, 10 Drawing Sheets

(56) References Cited

U.S. PATENT DOCUMENTS

| | | | |
|---|---|---|---|
| 10,008,110 B1* | 6/2018 | Herlocker | G08G 1/0112 |
| 10,011,247 B2* | 7/2018 | Joao | B64D 45/0031 |
| 10,857,700 B2* | 12/2020 | Balnis | C09D 183/04 |
| 2016/0114831 A1 | 4/2016 | Laine | |
| 2018/0319401 A1 | 11/2018 | Herzog et al. | |
| 2019/0256141 A1 | 8/2019 | Stroebel | |
| 2020/0180691 A1 | 6/2020 | Sandblom et al. | |
| 2021/0155239 A1* | 5/2021 | Kim | B60W 50/0098 |

OTHER PUBLICATIONS

Extended European Search Report for European Patent Application No. 21152305.5, dated Jun. 28, 2021, 9 pages.

\* cited by examiner

REVERSING ASSISTANT FOR A VEHICLE

RELATED APPLICATIONS

The present application claims priority to European Patent Application No. 21152305.5, filed on Jan. 19, 2021, and entitled "REVERSING ASSISTANT FOR A VEHICLE," which is incorporated herein by reference in its entirety.

TECHNICAL FIELD

The present disclosure relates to the field of vehicular control and in particular to a reversing assistant for a vehicle or vehicle combination.

BACKGROUND

It is a challenging task even for an experienced driver to carry out safe yet efficient reversing of a commercial heavy vehicle or vehicle combination in a spatially constrained area, such as a loading bay, industrial environment, historic street network, mine etc. Numerous assistive systems, often termed low-speed maneuvering assistants, have been proposed and implemented, including the reversing assistant described in the applicant's patent EP2997429B1. The assistant offers an undo functionality, which can be called upon to reverse the vehicle along a recorded forward path. Moreover, the problem of efficient motion planning and feedback control techniques for tractor-trailer combinations in spatially constrained environments is addressed in the doctoral thesis O. Ljungqvist, "Motion Planning and Feedback Control Techniques with Applications to Long Tractor-Trailer Vehicles", *Linköping Studies in Science and Technology*, Dissertations, no 2070 (2020).

While a large share of the user community will confidently hand over delicate maneuvers to an assistive system, a concern remains that the driver might activate the assistive system too late. For example, an experienced driver may choose to rely on the assistive system only after one or more unsuccessful manual attempts to maneuver the vehicle into position, and at that point the recorded path of interest may have been overwritten. It would be rather undesirable to see skilled drivers turn to the assistive system more often just for this artificial reason. Nor would it be an attractive workaround to equip the driver cab with yet another menu interface, which would require the driver to select among multiple recorded paths before the assisted reversing could start. Even with such a selection interface in place, it could not be guaranteed that the vehicle was always positioned and oriented in a manner allowing it to retrace the selected recorded path; in many cases, additional manual maneuvering would be required as preparation for the assisted reversing.

One problem is thus to provide a more usable reversing assistant.

SUMMARY

One objective of the present disclosure is to make available an undo-capable reversing assistant with a forgiving behavior. In particular, the availability the assistant would be unaffected by the driver's past attempts, if any, to maneuver the vehicle or vehicle combination manually. A further objective is to make available an undo-capable reversing assistant with an easy-to-use or intuitive user interface.

These and other objectives are achieved by the invention defined in the independent claims. The dependent claims relate to advantageous embodiments of the invention.

According to a first aspect of the invention, there is provided a method for assisted reversing of a vehicle. The method comprises: initiating a continuing recording of a current forward segment when the vehicle begins forward movement (e.g., after assisted reversing or manual reversing); offering the driver assisted reversing along the current forward segment to an operator of the vehicle; and repeatedly assessing whether the current forward segment is mergeable with a recorded preceding forward segment (e.g., the immediately preceding forward segment). If it is found that the current forward segment is mergeable with a recorded preceding forward segment, a merged segment comprising a tail section of the preceding forward segment, a head section of the current forward segment and a connecting section which joins these sections is determined and, for purposes of the continuing recording and the offered assisted reversing, the current forward segment is replaced with the merged segment.

A reversing assistant with the behavior according to the first aspect avoids the awkward scenario outlined above, where a driver underestimates the level of difficulty of a maneuvering task and realizes only after one or more attempts to resolve it manually that she needs the driving assistant. Instead, the first aspect of the invention may help prevent inadvertent deletion or overwriting of a previously recorded forward path segment. If the merging of the current and preceding forward segments is successful, the vehicle will be correctly positioned and oriented to retrace the preceding segment for the remainder of the merged segment.

In some embodiments, the mergeability is assessed by evaluating a simplified condition. The simplified condition may be a sufficient though not necessary criterion. Preferably, the simplified condition is simple (e.g., computationally affordable) and/or robust (e.g., measurement errors and other random factors have a limited influence on the outcome) to evaluate, though possibly at the price of missing some mergeable cases. Put differently, the merging is always successful if the simplified criterion evaluates true, but the merging might have been successful even if the simplified criterion had been was false.

In other embodiments, the mergeability is assessed by attempting to determine the connecting section subject to an additional condition. The attempted determination of the connecting section may use the same algorithm as is used for actual merging. The additional condition may target the length of the connecting section, its swept area, or its lateral deviation from the current and/or preceding forward segment.

In some embodiments, the merged segment may be performed subject to a continuity condition. The continuity condition may reflect the turning radius and other kinematic limitations of the vehicle.

According to a second aspect of the invention, there is provided a reversing assistant system for a vehicle. The system comprises: a first path memory for storing a continuously recorded current forward segment; a second path memory for storing a recorded preceding forward segment, wherein the system is configured to transfer the content of the first path memory to the second path memory when the vehicle resumes forward motion after reversing; a path merger observer configured to repeatedly assess whether the current forward segment is mergeable with the preceding forward segment and, if so, to trigger a path merging operation; and a path merger configured to execute a path merging operation and to substitute its output into the first path memory.

In an embodiment of the second aspect, the path merger is further configured to cause flushing of the second path memory when the path merging operation has completed.

In a third aspect, there is provided a computer program containing instructions for causing a computer, or the reversing assistant system in particular, to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and nonvolatile memories, such as permanent and non-permanent storage media of magnetic, optical or solid-state type. Still within the scope of "data carrier", such memories may be fixedly mounted or portable.

As used herein, the term "vehicle" shall in particular include an articulated vehicle, a vehicle combination or a vehicle unit of a vehicle combination. The term "vehicle combination" encompasses any of a combination vehicle, a truck-trailer and a road train. The relative terms "tail section" and "head section" of a recorded segment refer to the time of passage of the vehicle. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Figure 1:
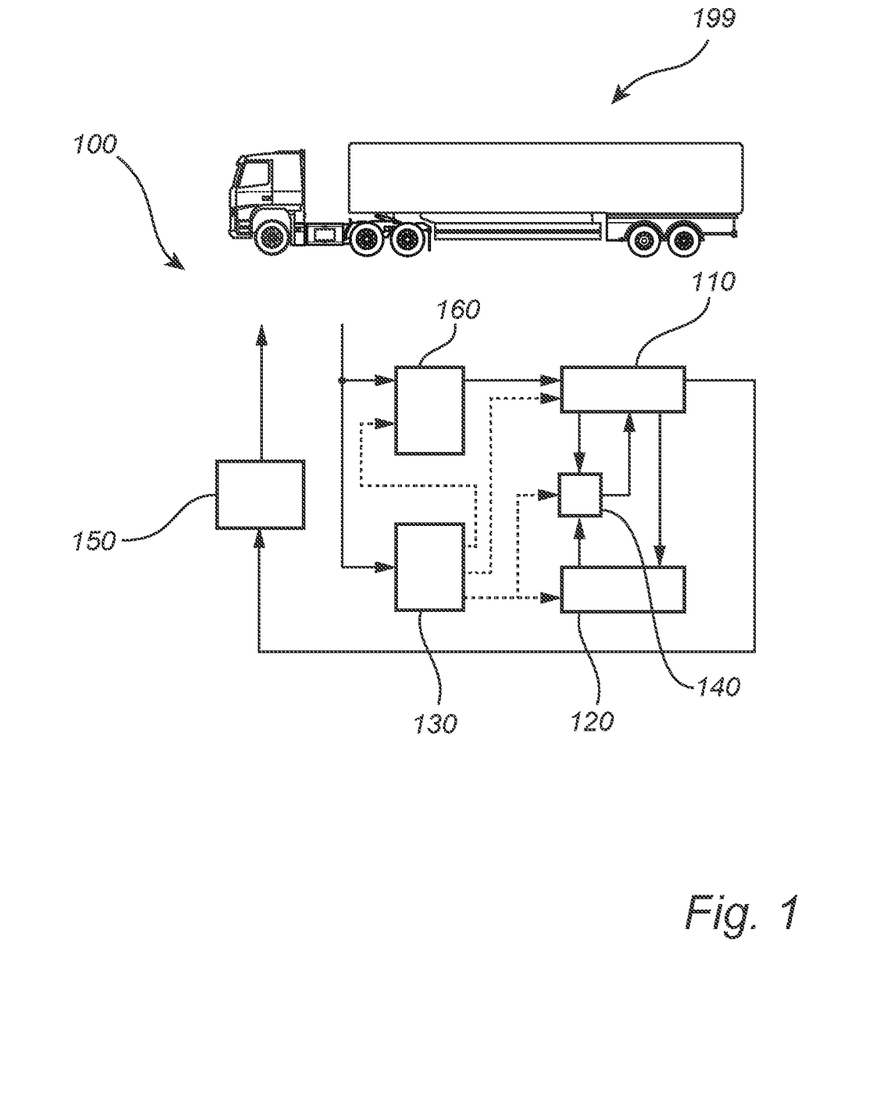
FIG. 1 is a functional block diagram of a reversing assistant system for a vehicle, according to an embodiment.

FIG. 1 shows a vehicle combination 199 consisting of a tractor and a trailer, which is associated with a reversing assistant system 100. The reversing assistant system 100 may be installed onboard one of the vehicle units of the vehicle combination 199 or in an external fixed or moving location, or it may be implemented with networked processing support ('cloud' resources). The reversing assistant system 100 may include the following functional units: a path recorder 160, which receives sensors signals from the vehicle combination 199 representing vehicle state information, from which its path can be read or derived. The path may refer to the position of an imaginary reference point (or its ground projection) somewhere on the vehicle combination 199; the reference point may for example be the center of the rear end of the trailer (cf. point R in FIG. 3A). The path recorder 160 may be connected to sensors of the wheel-motion, dead-reckoning, inertial, satellite, lidar, sonar or other type, or a combination thereof.

The path recorder 160 is configured to deposit data descriptive of the path in a first path memory 110. The depositing of recorded data in the first path memory no may be carried out recurrently or (quasi) continuously while the vehicle combination 199 is moving along a forward segment. A "continuing recording" in the sense of the claims may include extending the current forward segment from the head end onwards, which may concretely mean storing new data that represents the onward path in the first path memory 110. The remainder of the current forward segment may be maintained unchanged in the first path memory 110. Optionally, a tail section (oldest section) of the current forward segment may be deleted periodically to save storage space in the first path memory 110.

In the reversing assistant system 100, furthermore, there is provided a drive assistance unit 150, which is configured with a vehicle model that describes the vehicle combination 199 and can be utilized to determine drive actions (e.g., acceleration/braking signals, steering angles) causing the vehicle to reverse along the recorded forward segment. The vehicle model in the drive assistant unit 150 may be an inverse model which maps desired movements to a sequence of drive actions. Alternatively, the vehicle model may be a forward model allowing the drive assistance unit 150 to simulate the effect of a tentative sequence of drive actions and to adjust these if necessary. For a description of a generic undo-capable reversing assistant, reference is made to the applicant's patent EP2997429B1 or the above-identified thesis by Ljungqvist (2020).

The novel components of the reversing assistant system 100, according to an embodiment of the present invention, will be described next. There is provided a second path memory 120 with storage capabilities similar to those of the first path memory 110. The reversing assistant system 100 is configured to detect based on vehicle state information when the vehicle combination 199 resumes forward motion (e.g., after reversing) and, upon such detection, to transfer the content of the first path memory no into the second path memory 120. In normal operation of the system 100, therefore, the first path memory no will be storing a continuously recorded current forward segment $P_n$ and the second path memory 120 will store a recorded preceding forward segment $P_{n-2}$, if any exists. For purposes of the present invention, it is optional to store the intervening reverse segment $P_{n-1}$ in any memory in the system 100.

There is furthermore provided a path merger observer 130 configured to repeatedly assess whether the current forward segment $P_n$ is mergeable with the preceding forward segment $P_{n-2}$. The path merger observer's 130 assessment may be based on data that it collects from the sensor signals, in parallel to the path recorder 160, or may be based on the content of the path memories 110, 120 if the path merger observer 130 has been granted access to these. The assessment may include evaluating a simplified mergeability condition or attempting to generate connecting segment subject to an additional condition. If the path merger observer 130 finds that the two forward segments $P_{n-2}$, $P_n$ are mergeable, it triggers a path merger 140 to perform a path merging operation.

The path merger 140 is configured to execute a path merging operation and to substitute its output into the first path memory no. The path merger 140 may receive data from the first and second path memories 110, 120 and may store its output in the first path memory no. The further characteristics of the path merging operation will be described with reference to FIGS. 3A-3D.

In connection with the path merging operation, the path merger observer 130 may further apply control signals to the path recorder 160, the first path memory no and/or the second path memory 120, as shown by the dashed arrows emanating from the path merger observer 130. The control signals may order the path memories 110, 120 to make their content available to the path merger 140. This may further include flushing the second path memory 120 when the path merging operation has completed. Alternatively or additionally, the path merging operation may be accompanied by deactivation of the path merger observer 130 for the remainder of the current forward segment, as there is no longer any preceding forward segment available for merging. The path merger observer 130 thereby ceases to assess mergeability for the remainder of the forward movement.

The path merger observer 130, path merger 140, drive assistance unit 150 and path recorder 160 may be implemented as hardware or software modules. The architecture shown in FIG. 1 is entirely functional; it need not correspond to how underlying processing circuitry is structured. The path memories 110, 120 may include any type of volatile or nonvolatile memory hardware with a specified ability to retain the path data safely while the system 100 is powered and for the duration of a typical maneuvering sequence, such as approximately one hour.

Figure 11A:
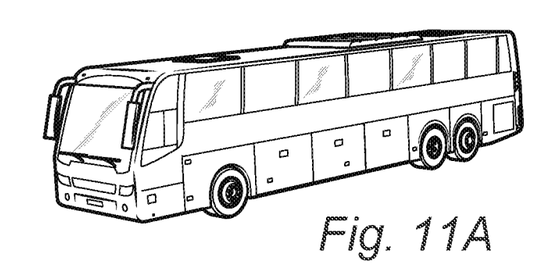
FIGS. 11A-11D show example vehicles, for which the present embodiments may be adapted.
Figure 11B:
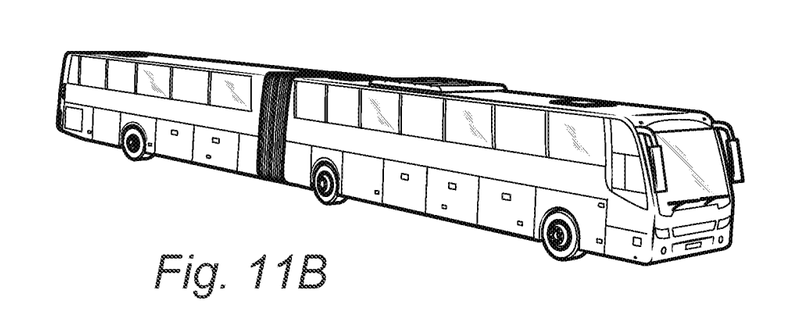
Figure 11C:
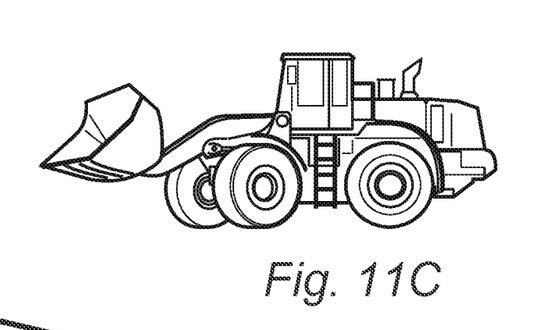
Figure 11D:
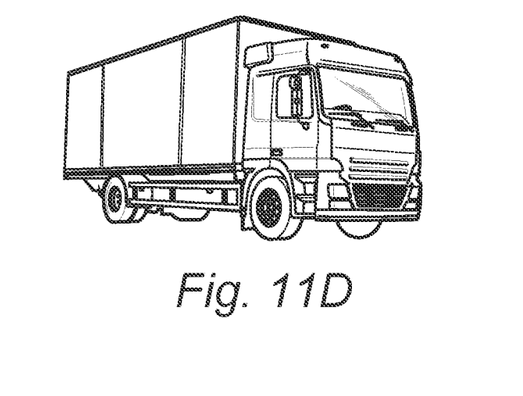

The reversing assistant system 100 has been described in connection with a vehicle combination 199 but the discussion is equally valid in the case of a single vehicle unit. The reference number 199 will refer to a single vehicle in some of the figures to be described next. The invention is applicable at least to a single rigid vehicle (FIGS. 11A, 11D), an articulated commercial passenger vehicle (FIG. 11B), an articulated construction equipment vehicle (FIG. 11C) and a vehicle combination with two vehicle units (FIG. 1) or three vehicle units.

FIGS. 3A-3D are a series of top views showing successive positions of a tractor-trailer vehicle combination 199 which is maneuvering in a constrained environment 300. The hashed area of the drawing corresponds to non-navigable space, such as sidewalks, buildings etc. that delimit the street network where the vehicle combination 199 is permitted to drive.

Figure 3A:
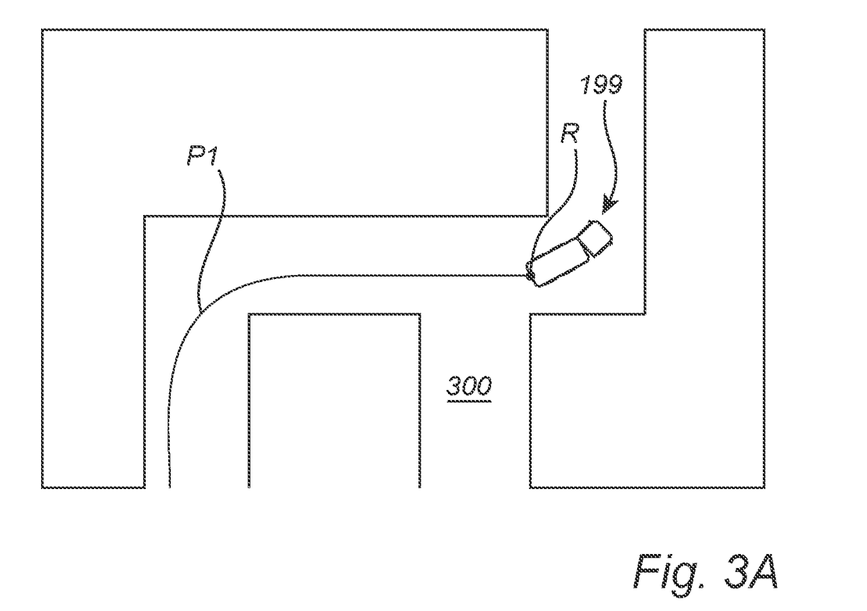
FIGS. 3A-3D are a sequence of top views of a vehicle combination which is maneuvering in a constrained environment.

In FIG. 3A, the vehicle combination 199 has moved forward along a first segment $P_1$, as traced by reference point R at the rear of the trailer. It may be assumed that the driver has chosen not to continue along the rightmost vertical street and wishes to leave the depicted area through the left or middle street.

Figure 3B:
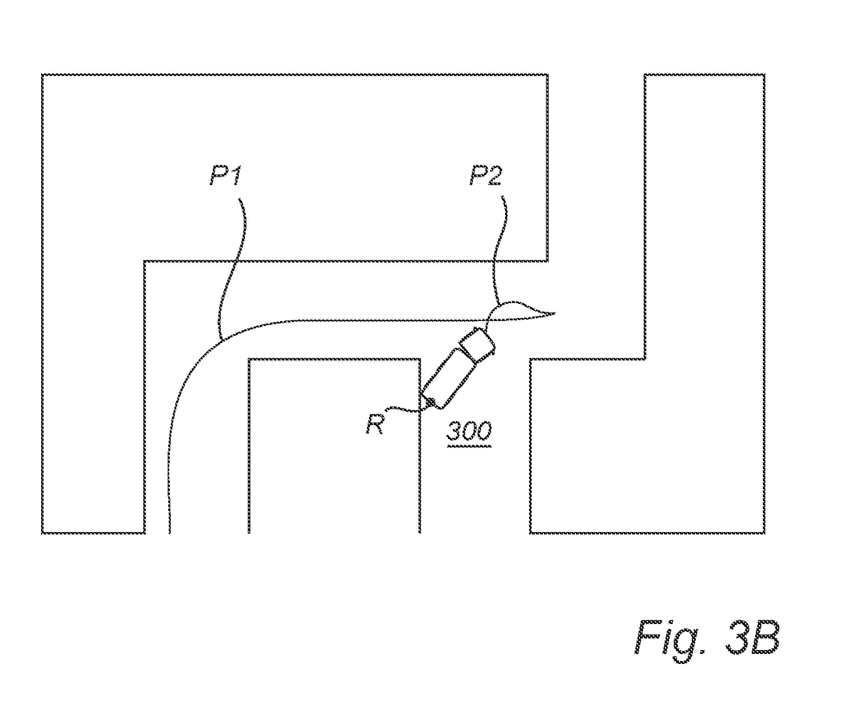

In FIG. 3B, the vehicle combination 199 has moved backward along a second segment $P_2$, which is partially obscured by the trailer, down the middle vertical street. The vehicle combination 199 cannot continue reversing from this position.

Figure 3C:
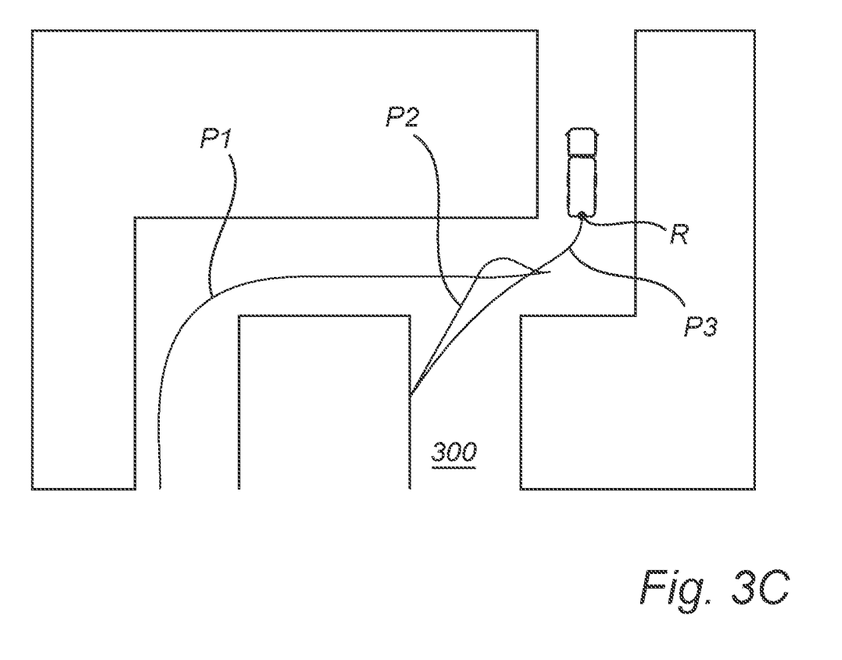

FIG. 3C shows the vehicle combination 199 some distance into the rightmost street, after a forward movement along a third segment $P_3$. Having attempted to reverse down the middle vertical street but realized the geometry is too awkward, the driver's priority now becomes to use the leftmost street. At this point, a reversing assistant according to the prior art would only offer the driver the option of reversing along the third path $P_3$, which not useful. This is one of the scenarios that the present invention seeks to address.

Figure 3D:
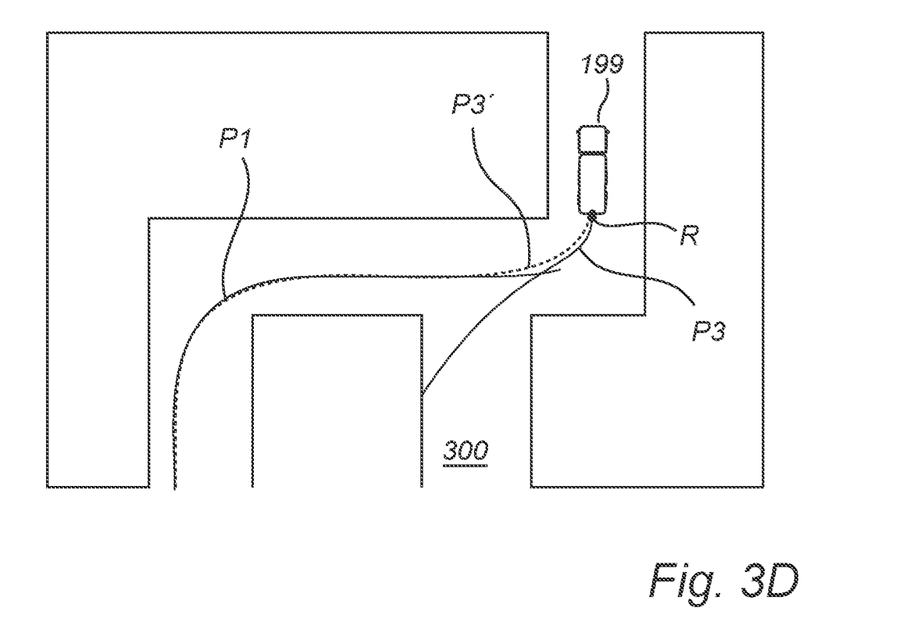

FIG. 3D shows the vehicle combination 199 drawn in the same position as in FIG. 3C, but with the addition of a merged segment $P'_3$ drawn in dashed line. (The second segment $P_2$ is omitted so as not to obscure the merged segment $P'_3$.) The merged segment is shown in detail in FIG. 4, together with a less suitable alternative merged segment, and will be discussed next.

Figure 4:
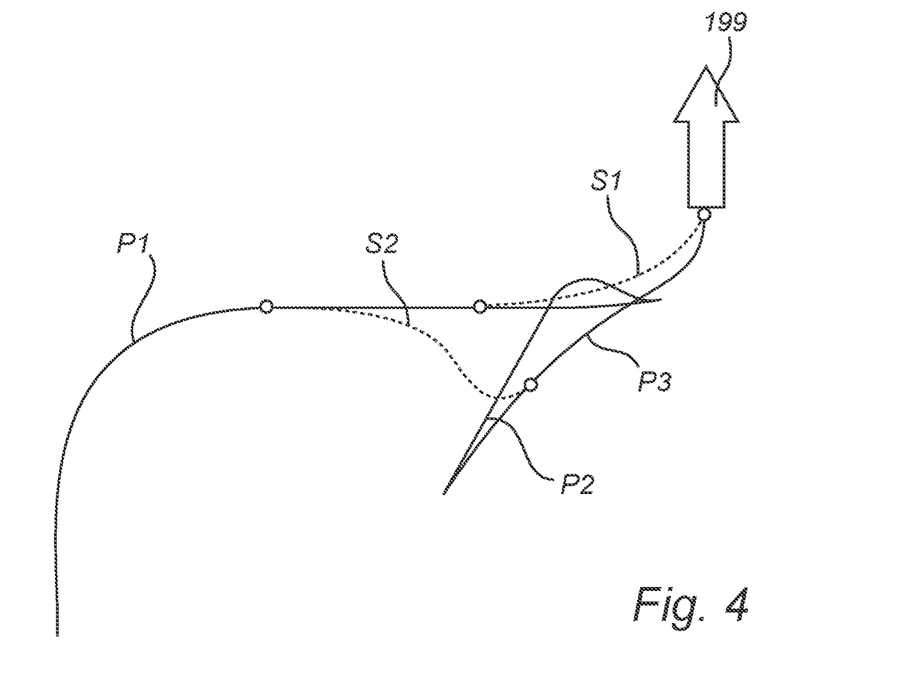
FIG. 4 shows paths traced by a rear reference point on the vehicle in FIGS. 3A-3D together with tentative connecting sections for joining the two recorded forward segments.

In FIG. 4, where a simplified symbol is used for the vehicle combination 199, the merged segment corresponds to the combination of a tail section of the first segment $P_1$, a head section of the third segment $P_3$, and a connecting section $S_1$ which joins these two sections. In other words, the merged segment $P'_3$ defines a movement from the tail section of the first segment $P_1$ to the head section of the third segment $P_3$ without passing by the second segment $P_2$. The tail section of the first segment $P_1$ extends up to the encircled left endpoint of the connecting section $S_1$. The beginning of the tail section may correspond to the oldest location data still kept in any of the path memories 110, 120. The head section of the third segment $P_3$ begins at the right encircled endpoint of the connecting section $S_1$.

Figure 7:
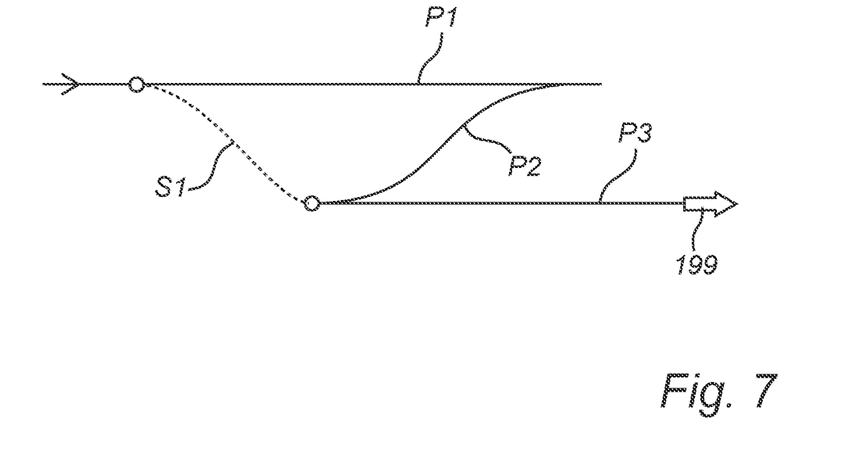

The head section in FIG. 4 is fairly short, and situations can be imagined where it may even have zero length, i.e., the head section is a point. This could be the case if the path merging operation is initiated immediately when the forward movement is resumed, or if the vehicle combination 199 is stationary while the part merging operation executes. A related example is illustrated in FIG. 7, where the entirety of the current forward segment $P_3$ is included in the merged segment. Here, the path merging operation can be initiated immediately when the vehicle combination 199 resumes forward movement, or at an arbitrary point in time after the resumption.

Preferably, a continuity condition is observed when the path merger 140 determines the connecting section $S_1$, including the points at which it joins the first and third segments $P_1$, $P_3$. In some embodiments, the continuity condition is one or more of the following:

C3-1: The merged segment shall be m times continuously differentiable throughout, such as m=2 or m=3 times.

C3-2: The curvature of the merged segment shall not exceed a threshold $K_{32}$.

In relation to condition C3-2, it is recalled that the curvature κ is the inverse of the local radius of curvature on a path. If the path is represented as a parametric curve $(x(t),y(t)), t\in \mathbb{R}$, the curvature can be calculated as $$\kappa = \frac{x'y'' - x''y'}{(x'^2 + y'^2)^{3/2}}.$$

The value of $K_{32}$ may be determined empirically or may be computed from known vehicle parameters, such as turning radius, axle spacing, drawbar length etc.

Each of the continuity conditions applies to the merged segment in its entirety, that is, the head section, connecting section, tail section and the joining points therebetween. For paths that are represented as polynomials (e.g., splines, Bézier curves), condition C3-1 corresponds to a $C^n$ patching constraint, which is well understood and can in general be translated into a condition on the polynomial coefficients, control points or the like.

A still further way in which condition C3-1 or C3-2 can be implemented is to represent the recorded segments as a collection of time-stamped two-dimensional points (this is generally how sensors deliver the vehicle location and therefore may require a quite limited computational effort) and to generate the merged segment as an interpolated polynomial in the time variable which has the desired differentiability or maximum-curvature property. For instance, the interpolation may be designed to generate a function which is piecewise a polynomial of degree 3. Separate interpolation processes may be executed for the x and the y components of the two-dimensional points. A key step in this implementation is to decide where the tail section of the preceding forward segment shall end and where the head section of the current forward segment shall begin; this decision-making may be guided by any of conditions C2-1, C2-2 and C2-3 to be described below. The resulting head and tail segments (optionally, after removing the remoter portions of these segments) may be provided as inputs to the polynomial interpolation process.

FIG. 4 furthermore shows an alternative merged segment. Compared to the merged segment P'$_3$, the alternative merged segment bifurcates off the first segment P$_1$ earlier (left encircled endpoint), passes to an alternative connecting section S$_2$ and also rejoins the third segment P$_3$ earlier (right encircled endpoint). While the merged segment P'$_3$ and the alternative merged segment are comparable in terms of continuity, on the whole, the alternative merged segment may be perceived as less suitable in practical circumstances. For instance, while it may be theoretically possible to reverse the vehicle combination 199 back to the first segment P$_1$ already when it reaches the right endpoint of the alternative connecting section S$_2$ (and the drive assistance unit 150 may be able to achieve this), an experienced driver might prefer to continue some distance forward along the third segment P$_3$ before she initiates the reversing. This makes sense because the total reverse trajectory will be shorter and/or may constitute a smaller detour from the first and/or third segments P$_1$, P$_3$; it is generally acknowledged that reversing of a vehicle involves greater risks than forward movement.

These and other considerations may be automated by implementing one or more of the following additional conditions in the reversing assistant system 100:

C2-1: The length of the connecting section shall not exceed a threshold $K_{21}$.
C2-2: The swept area of the connecting section shall not exceed a threshold $K_{22}$.
C2-3: The connecting section's lateral deviation from the current and/or preceding forward segment shall not exceed a threshold $K_{23}$.

In relation to condition C2-2, the swept area may be determined by positioning the corners of each vehicle unit at each position on the segment, computing the area covered by the vehicle units at each position, and summing over the complete path travelled by the vehicle combination 199.

On the one hand, these conditions may be used—alone or in combination—as absolute constraints that must be fulfilled before the path merger observer 130 orders merging of two recorded forward segments. On the other hand, alternatively or additionally, the conditions can be used to find a preferable segment out of multiple tentative merged segments. It may be suitable to use different (e.g., stricter) values of the thresholds $K_{21}$, $K_{22}$, $K_{23}$ when the conditions are used to find a preferable merged segment.

Figure 5:
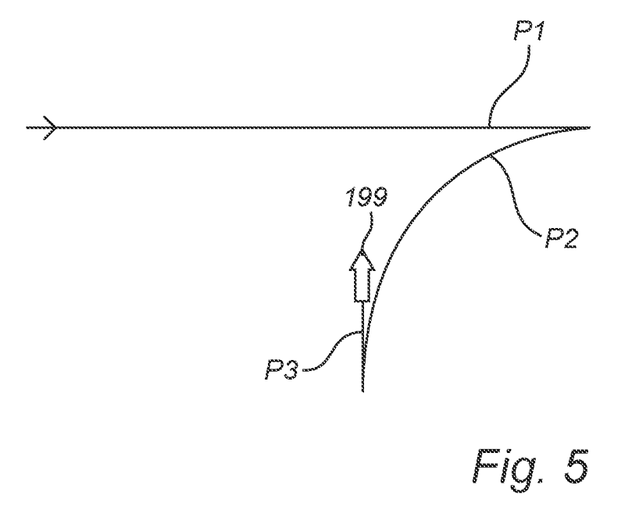
FIGS. 5, 6 and 7 show example vehicle paths.
Figure 6:
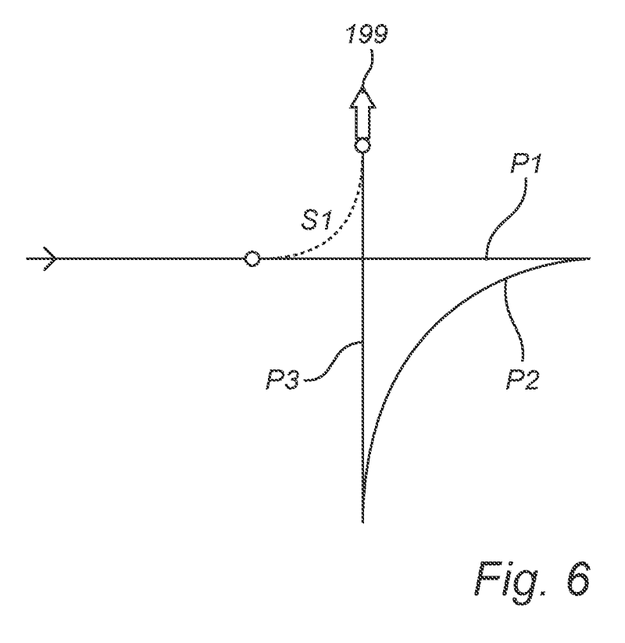

FIGS. 5 and 6 illustrate the action of at least the length-oriented condition C2-1. A horizontally drawn forward first segment P$_1$ is followed by a curved reverse second segment P$_2$ and a vertically drawn third segment P$_3$. FIG. 5 shows a vehicle 199 at such position that the completed third segment P$_3$ is relatively shorter than the first and second segments P$_1$, P$_2$. A hypothetical connecting segment that joins a tail section of the first segment P$_1$ and a head section of the third segment P$_3$ yet fulfils continuity conditions such as C3-1 or C3-2 would be fairly long. The threshold $K_{21}$ may be set so as to disqualify a hypothetical connecting segment with these characteristics.

FIG. 6 differs from FIG. 5 only in that the completed third segment P$_3$ is longer. The completed third segment P$_3$ crosses the first segment P$_1$ and extends past this. The length-oriented condition C2-1, which evaluated false in the situation of FIG. 5, may be fulfilled for FIG. 6 without changing threshold $K_{21}$. Therefore, the path merger observer 130 may conclude that it is possible to generate a connecting section S$_1$ which joins the tail section of the first segment P$_1$ and the head section of the third segment P$_3$ and also fulfils a continuity condition.

The description so far has been concerned with embodiments where the decision to initiate a path merging operation is based on one or more attempts to perform the path merging operation, and possibly subject to an additional condition. In other embodiments, which may be suitable in circumstances when processing power is to be economized, the mergeability is evaluated indirectly by means of a simplified condition. The simplified condition is formulated in terms of the vehicle's 199 current position and orientation relative to the preceding forward segment P$_{n-2}$. The simplified condition may be independent of previously recorded points on the current forward segment P$_n$. The simplified condition is a sufficient mergeability criterion but may not be a necessary one.

Example simplified conditions include:

C1-1: A nearby portion of the preceding forward segment P$_{n-2}$ (e.g., separated by at most r=$K_{11}$ units from a reference point R on the vehicle 199) shall be located to the rear of the vehicle 199.
C1-2: The vehicle's 199 front intersecting angle φ with the preceding forward segment P$_{n-2}$ shall not exceed a threshold $K_{12}$.
C1-3: The vehicle's 199 rear intersecting angle ρ with the preceding forward segment P$_{n-2}$ shall not exceed a threshold $K_{13}$.
C1-4: A predetermined reference point R on the vehicle shall be separated from the preceding forward segment P$_{n-2}$ by at most a threshold $K_{14}$.

C1-5: A predetermined reference point R on the vehicle shall be contained in a first band of width $K_{15}^{(1)}$ around the preceding forward segment $P_{n-2}$, and an imaginary rearward extension of the vehicle shall be contained in a second band of width $K_{15}^{(2)}$ around the preceding forward segment $P_{n-2}$.

It will be within the skilled person's abilities, possibly with the aid of routine experimentation, to assign such values to the constants $K_{11}$, $K_{12}$, $K_{13}$, $K_{14}$, $K_{15}^{(1)}$, $K_{15}^{(2)}$ that these simplified conditions are sufficient mergeability conditions.

Figure 10A:
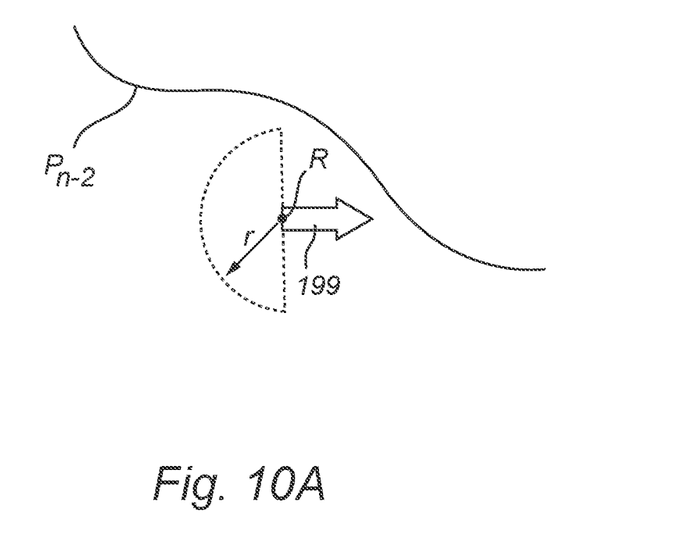
FIGS. 10A-10B illustrates another simplified mergeability condition.
Figure 10B:
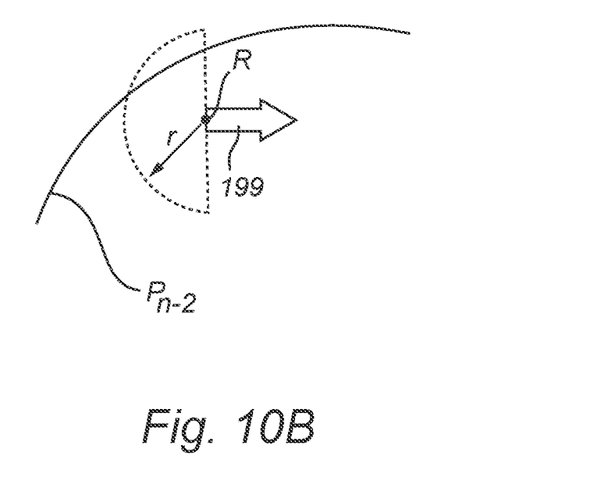

FIGS. 10A-10B illustrate condition C1-1. Here, the "nearby portion" is understood to be that portion, if any, of the preceding forward segment $P_{n-2}$ which is at most $r=K_{11}$ units away from the rear reference point R on the vehicle 199. Then, the condition C1-1 is fulfilled as soon as any portion of the preceding forward segment $P_{n-2}$ passes through a semicircle of radius $r=K_{11}$ centered on the reference point R. The condition C1-1 is false in the situation shown in FIG. 10A and true in FIG. 10B.

Figure 8:
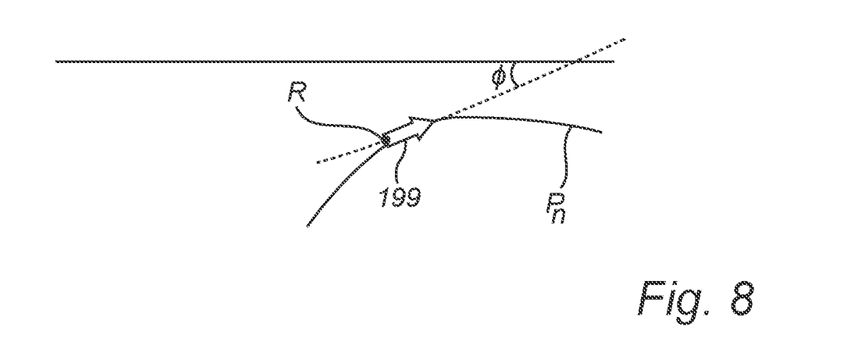
FIGS. 8 and 9 illustrate a simplified mergeability condition formulated in terms of a front or a rear intersecting angle of a vehicle.
Figure 9:
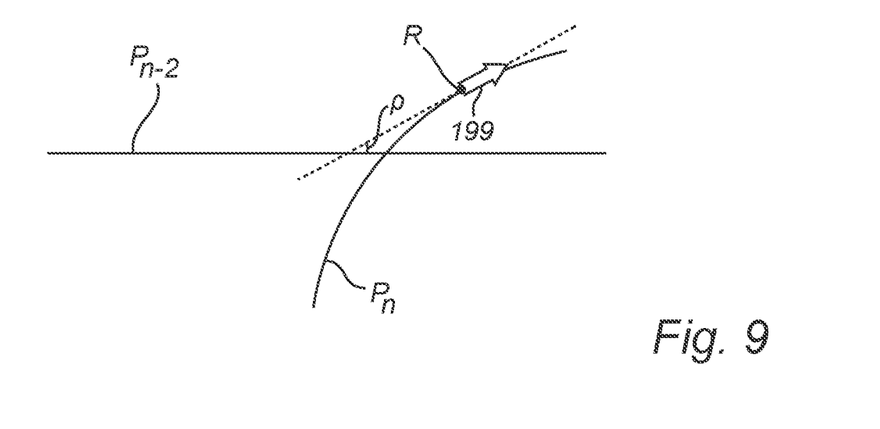

FIGS. 8 and 9 shows the definitions of the front intersecting angle φ and rear intersecting angle ρ of the vehicle 199, to which conditions C1-2 and C1-3 refer. The angles are independent of the longitudinal position of the reference point R.

Figure 12:
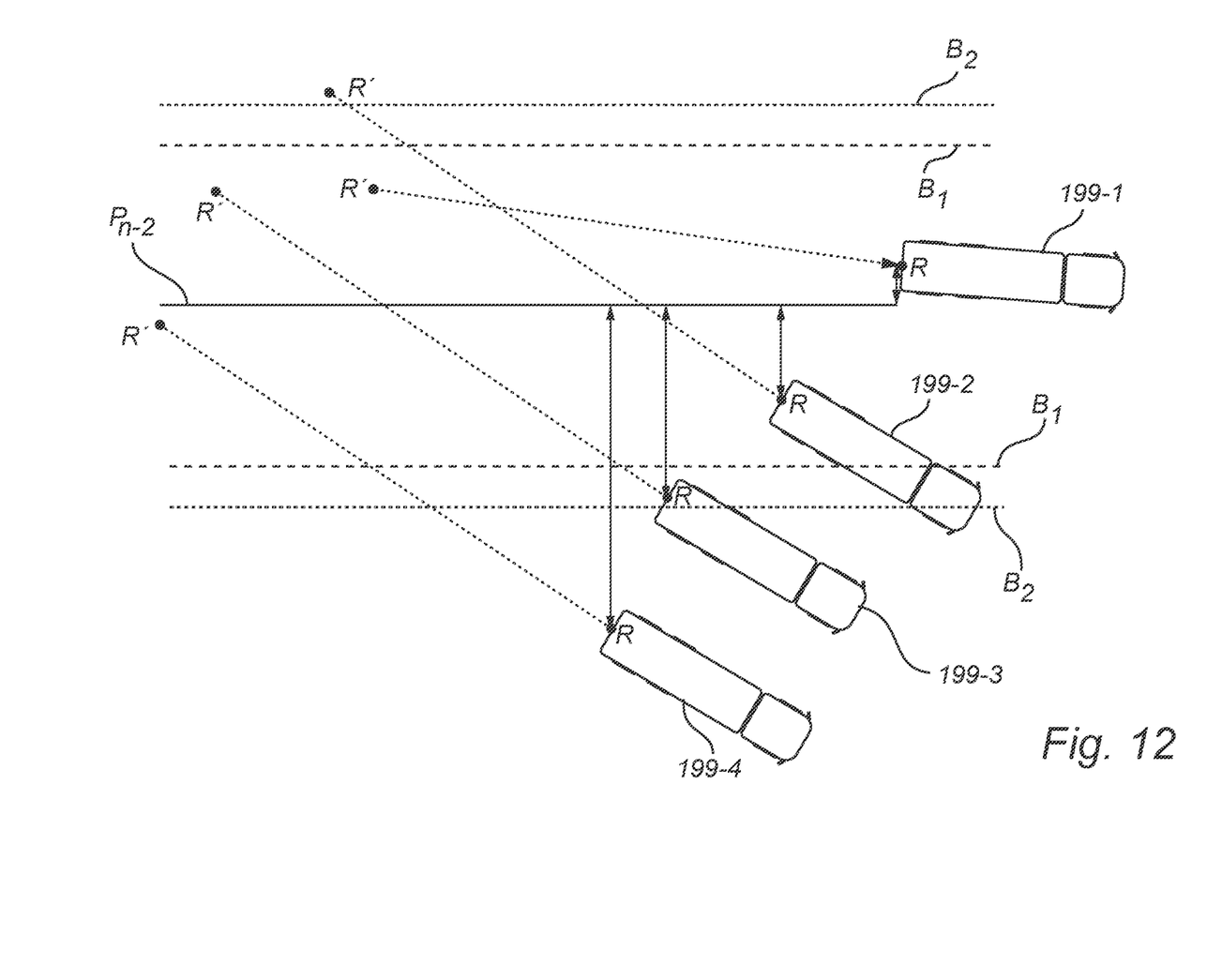
FIG. 12 illustrates a further simplified mergeability condition formulated in terms of two bands around the preceding forward segment.

Condition C1-5 is illustrated by FIG. 12, which shows a vehicle 199 for which a reference point R and an imaginary rearward extension RR' has been defined. The rearward extension is oriented along the longitudinal axis of the vehicle 199 or, as applicable, along the longitudinal axis of the rearmost vehicle unit of a vehicle combination 199. Curves $B_1$, which run parallel to the preceding forward segment $P_{n-2}$, constitute the boundary of the first band, which has width $K_{15}^{(1)}$. Similarly, curves $B_2$, which run parallel to the preceding forward segment $P_{n-2}$, are the boundary of the second band, which is $K_{15}^{(2)}$ units wide. There is no a priori restriction on the width ratio of the first and second bands to which condition C1-5 refers; rather, these may be configured in a manner suited to the vehicle 199 under consideration and the environment in which it is to operate. Accordingly, the bands may have equal widths, or the first band may be wider than the second band ($K_{15}^{(1)} > K_{15}^{(2)}$), or vice versa like FIG. 12 shows. It may be assumed without loss of generality that the length of the rearward extension RR' is 1 unit, since it is only to be compared with the widths of the first and second bands.

FIG. 12 shows four different vehicle positions 199-1, 199-2, 199-3, 199-4. The sub-condition relating to the first band is fulfilled for positions 199-1,199-2 and 199-3. The sub-condition relating to the second band is fulfilled for positions 199-1, 199-3 and 199-4. Accordingly, condition C1-5 as a whole is fulfilled (i.e., path merging is deemed to be possible) for positions 199-1 and 199-3 but not for positions 199-2 and 199-4. FIG. 12 is also useful as an illustration of condition C1-4, which corresponds to the sub-condition of C1-5 which relates to the first band.

Figure 2:
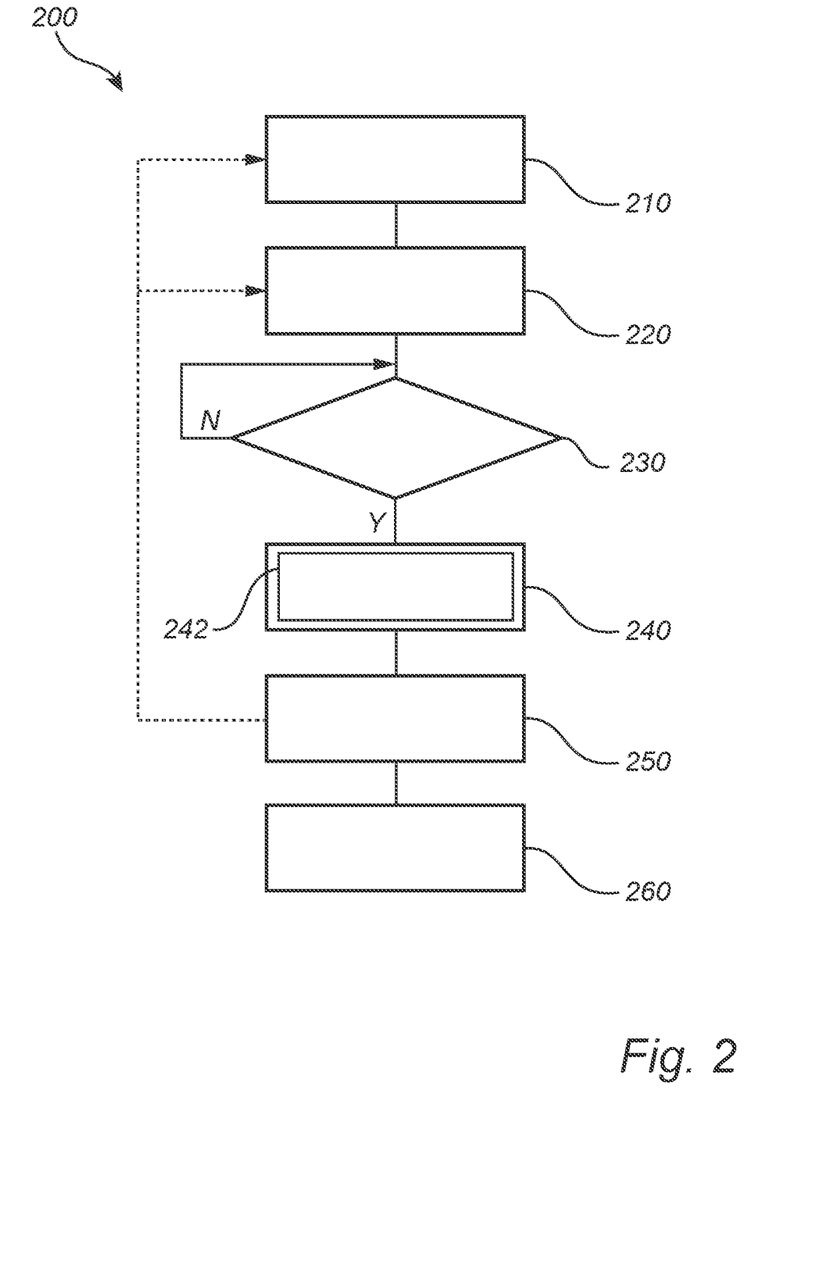
FIG. 2 is a flowchart of a method for assisted reversing of a vehicle, according to an embodiment.

The behavior of the reversing assistant system 100 may be summarized as the method 200 that is represented in FIG. 2 as a flowchart. The method may alternatively be implemented in a general-purpose programmable computer, which has access to vehicle state information of the vehicle 199 under consideration.

In a first step 210 of the method 200, a continuing recording of a current forward segment $P_n$ is initiated when the vehicle begins forward movement.

In a second step 220, which may overlap in time with at least the first step 210, an operator of the vehicle 199 is offered assisted reversing along the current forward segment $P_n$. The operator may be a driver or a person supervising the operation of an autonomous vehicle. When the operator accepts the assisted reversing offered, a vehicle model may be used to determine, in step 260, such drive actions that cause the vehicle to reverse along the current forward segment. The second step 220 may further continue while the subsequent steps 230, 240 and 250 are executed. Accordingly, step 260 may be initiated at a time when any of steps 220, 230, 240 and 250 is being executed; this jump structure has been left implicit in FIG. 2 for the sake of visibility.

In a third step 230, it is assessed whether the current forward segment $P_n$ can be merged with a recorded preceding forward segment $P_{n-2}$. As seen above, this assessment may involve attempting to complete the path merger—possibly subject to an additional condition—or evaluating a simplified condition. The third step 230 may be repeated periodically (N branch) or even run continuously until a positive mergeability conclusion is reached.

If it has been found (Y branch) that the current forward segment $P_n$ can be merged with a recorded preceding forward segment $P_{n-2}$, the method 200 proceeds to a fourth step 240, where a merged segment $P'_n$ is determined. The merged segment $P'_n$ comprises a tail section of the preceding forward segment $P_{n-2}$, a head section of the current forward segment $P_n$ and a connecting section $S_1$ which joins these sections. The fourth step 240 may include a substep 242 of executing a polynomial or spline interpolation process.

The method 200 includes a fifth step 250 which, like the fourth step 240, is executed only when there is a positive finding in step 230 that the current forward segment $P_n$ can be merged with a recorded preceding forward segment $P_{n-2}$. In the fifth step 250, the current forward segment $P_n$ is replaced with the merged segment $P'_n$ as far as the continuing recording and the assisted reversing offered to the operator are concerned. More precisely, the offering of assisted reversing (step 220) may be resumed after the replacement 250. Then, when the operator accepts the assisted reversing, the vehicle model invoked in step 260 will be used to determine drive actions causing the vehicle to reverse along the merged segment $P'_n$ rather than the originally recorded forward segment $P_n$. Alternatively, as illustrated in FIG. 2, if the operator does not accept the offered assisted reversing and there is instead an intervening segment $P_{n+1}$ of manual reversing, the execution of the method 200 may loop back to the first step 210. In the second run of the first step 210, a continuing recording of the new forward segment $P_{n+2}$ is initiated, and the recording of segment $P_n$ is treated as the preceding forward segment.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method for assisted reversing of a vehicle, comprising:
   initiating, by a computer, a continuing recording of a current forward segment when the vehicle begins forward movement;
   offering, by the computer, assisted reversing along the current forward segment to an operator of the vehicle;
   repeatedly, by the computer, assessing whether the current forward segment is mergeable with a recorded preceding forward segment; and in response to a positive finding of mergeability:
- determining, by the computer, a merged segment comprising a tail section of the preceding forward segment, a head section of the current forward segment, and a connecting section which joins these sections, wherein the determining of the merged segment is performed subject to a continuity condition; and
- replacing, by the computer, the current forward segment with the merged segment.

2. The method of claim 1, wherein the assessment of mergeability is based on a simplified condition in terms of the vehicle's current position and orientation relative to the preceding forward segment.

3. The method of claim 2, wherein the simplified condition stipulates at least one of the following:
- a nearby portion of the preceding forward segment shall be located to the rear of the vehicle;
- the vehicle's front intersecting angle with the preceding forward segment shall not exceed a first threshold;
- the vehicle's rear intersecting angle with the preceding forward segment shall not exceed a second threshold;
- a predetermined reference point on the vehicle shall be separated from the preceding forward segment by at most a third threshold;
- a predetermined reference point on the vehicle shall be contained in a first band around the preceding forward segment, and an imaginary rearward extension of the vehicle shall be contained in a second band around the preceding forward segment.

4. The method of claim 1, wherein the assessment of mergeability includes attempting to determine the connecting section subject to an additional condition stipulating at least one of the following:
- the length of the connecting section shall not exceed a fourth threshold;
- the swept area of the connecting section shall not exceed a fifth threshold;
- the connecting section's lateral deviation from the current and/or preceding forward segment shall not exceed a sixth threshold.

5. The method of claim 1, wherein the determining of the merged segment is performed subject to the continuity condition stipulating at least one of the following:
- the merged segment shall be m times continuously differentiable throughout, such as m=2 or m=3 times;
- the curvature of the merged segment shall not exceed a seventh threshold.

6. The method of claim 1, wherein the determining of the merged segment includes determining the connecting section by polynomial interpolation or spline interpolation.

7. The method of claim 1, further comprising, in response to a positive finding of mergeability:
- ceasing to assess mergeability for the remainder of the forward movement.

8. The method of claim 1, further comprising:
- in response to operator confirmation, using a vehicle model to determine drive actions causing the vehicle to reverse along the current forward segment.

9. The method of claim 1, which is implemented in an articulated vehicle or in at least one unit of a vehicle combination.

10. A reversing assistant system for a vehicle, the system comprising:
- a first path memory for storing a continuously recorded current forward segment;
- a second path memory for storing a recorded preceding forward segment, wherein the system is configured to transfer the content of the first path memory to the second path memory when the vehicle resumes forward motion after reversing;
- a path merger observer configured to repeatedly assess whether the current forward segment is mergeable with the preceding forward segment and, if so, to trigger a path merging operation; and
- a path merger configured to execute a path merging operation and to substitute its output into the first path memory;
- wherein the path merging operation comprises determining a merged segment comprising a tail section of the preceding forward segment, a head section of the current forward segment, and a connecting section which joins these sections;
- wherein the merged segment is determined subject to a continuity condition.

11. The system of claim 10, wherein the path merger is further configured to flush the second path memory on completion of the path merging operation.

12. The system of claim 10, further comprising a vehicle model representative of the vehicle, wherein the model is operable to provide drive actions causing the vehicle to reverse along the recorded forward segment.

* * * * *